US011777641B2

(12) United States Patent
Kanamarlapudi et al.

(10) Patent No.: US 11,777,641 B2
(45) Date of Patent: Oct. 3, 2023

(54) TECHNIQUES FOR RADIO AWARE CODEC RATE ADAPTATION

(71) Applicant: QUALCOMM Incorporated, San Diego, CA (US)

(72) Inventors: Sitaramanjaneyulu Kanamarlapudi, San Diego, CA (US); Harish Bhandiwad, San Diego, CA (US); Touseef Khan, San Diego, CA (US); Kavya Putluri, San Diego, CA (US); Soo-Ki Choi, San Diego, CA (US); Manjinder Singh Sandhu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 17/449,359

(22) Filed: Sep. 29, 2021

(65) Prior Publication Data

US 2022/0109520 A1 Apr. 7, 2022

Related U.S. Application Data

(60) Provisional application No. 63/198,190, filed on Oct. 1, 2020.

(51) Int. Cl.
*H04L 1/00* (2006.01)

(52) U.S. Cl.
CPC .......... *H04L 1/0009* (2013.01); *H04L 1/0002* (2013.01)

(58) Field of Classification Search
CPC ..................... H04L 1/0009; H04L 1/0002
See application file for complete search history.

(56) References Cited

U.S. PATENT DOCUMENTS

2007/0025324 A1* 2/2007 Kim ................... H04W 88/181
370/349
2009/0080423 A1* 3/2009 Ewing ................. H04W 28/06
370/389

(Continued)

FOREIGN PATENT DOCUMENTS

WO    WO-0031990 A2    6/2000
WO    WO-2016164611 A1  10/2016
WO    WO-2017030657    2/2017

OTHER PUBLICATIONS

Ericsson: "On PDCP Interruptions During Handover for NTN", 3GPP Draft, 3GPP TSG-RAN WG2 #107, R2-1910805, On PDCP Interruptions During Handover for NTN, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051768572, 4 Pages, Retrieved from the Internet: URL: http://www.3gpp.org/ftp/tsg_ran/WG2_RL2/TSGR2_107/Docs/R2-1910805.zip [Retrieved on Aug. 15, 2019], The Whole Document.

(Continued)

*Primary Examiner* — Min Jung
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify radio access technology (RAT) state information associated with the UE, the RAT state information including an indication of whether the UE is operating in a steady state or is operating in a transition state. The UE may adapt a codec rate associated with an application of the UE based at least in part on whether the UE is operating in the steady state or is operating in the transition state. Numerous other aspects are provided.

30 Claims, 5 Drawing Sheets

(56) References Cited

U.S. PATENT DOCUMENTS

| | | | |
|---|---|---|---|
| 2014/0219119 A1 | 8/2014 | Ishida et al. | |
| 2016/0302128 A1* | 10/2016 | Anchan | H04W 36/0022 |
| 2017/0055184 A1* | 2/2017 | Hajj-Ahmad | H04W 36/0079 |
| 2018/0102871 A1* | 4/2018 | Wu | H04W 36/00 |
| 2018/0160298 A1* | 6/2018 | Wang | H04M 7/006 |
| 2019/0037001 A1* | 1/2019 | Fujishiro | H04L 1/0009 |
| 2019/0349118 A1* | 11/2019 | Chang | H04W 28/22 |
| 2020/0045587 A1* | 2/2020 | Choi | H04W 72/085 |

OTHER PUBLICATIONS

International Search Report and Written Opinion—PCT/US2021/071654—ISA/EPO—dated Jan. 31, 2020.
Sony: "Discussions on Handover in NTN", 3GPP Draft, 3GPP TSG RAN WG1 Meeting #93, R1-1807243, NTN Handover V2, 3rd Generation Partnership Project (3GPP), Mobile Competence Centre, 650, Route Des Lucioles, F-06921 Sophia-Antipolis Cedex, France, vol. RAN WG1, No. Busan, S. Korea, May 21, 2018-May 25, 2018, May 20, 2018 (May 20, 2018), XP051442439, 5 Pages, Retrieved from the Internet: URL: http://www.3gpp.org/ftp/Meetings%5F3GPP%5FSYNC/RAN1/Docs/ [Retrieved on May 20, 2018], The Whole Document.

* cited by examiner

TECHNIQUES FOR RADIO AWARE CODEC RATE ADAPTATION

CROSS-REFERENCE TO RELATED APPLICATION

This Patent Application claims priority to U.S. Provisional Patent Application No. 63/198,190, filed on Oct. 1, 2020, entitled "TECHNIQUES FOR RADIO AWARE CODEC RATE ADAPTATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for radio aware codec rate adaptation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/L 1E-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LIE, NR, and other radio access technologies remain useful.

SUMMARY

In some aspects, a method of wireless communication performed by a UE includes identifying RAT state information associated with the UE, the RAT state information including an indication of whether the UE is operating in a steady state or is operating in a transition state; and adapting a codec rate associated with an application of the UE based at least in part on whether the UE is operating in the steady state or is operating in the transition state.

In some aspects, the indication indicates that the UE is operating in the transition state, and adapting the codec rate comprises: pausing a determination of an adapted codec rate for a period of time based at least in part on the indication that the UE is operating in the transition state; and resuming the determination of the adapted codec rate after the period of time.

In some aspects, the determination of the adapted codec rate is resumed based at least in part on another indication that the UE is operating in the steady state.

In some aspects, the indication indicates that the UE is operating in the transition state, and adapting the codec rate comprises: modifying a time window associated with determining an adapted codec rate based at least in part on the indication that the UE is operating in the transition state, and determining the adapted codec rate based at least in part on the modified time window.

In some aspects, the indication indicates that the UE is operating in the transition state, and the codec rate is adapted based at least in part on a hysteresis-based trigger, a timer-based trigger, or an event-based trigger.

In some aspects, the transition state is associated with an ongoing configuration or radio network coordination procedure associated with the UE.

In some aspects, the transition state is associated with a radio reconfiguration of the UE, a handover of the UE, or a reselection associated with the UE.

In some aspects, the transition state is associated with a thermal state of the UE.

In some aspects, the transition state is associated with a power headroom state of the UE.

In some aspects, the transition state is associated movement of a cell in a non-terrestrial network.

In some aspects, the indication indicates that the UE is operating in the steady state, and adapting the codec rate comprises: determining an adapted codec rate based at least in part on the indication that the UE is operating in the steady state.

In some aspects, the adaptation of the codec rate is further based at least in part on an amount of data, associated with the application operating on the UE, that is queued for transmission by the UE.

In some aspects, the adaptation of the codec rate is further based at least in part on a total amount of data transmitted by the UE during a period of time.

In some aspects, the adaption of the codec rate is further based at least in part on a type of RAT being used by the UE.

In some aspects, the adaption of the codec rate is further based at least in part on information associated with a radio configured throughput.

In some aspects, a UE for wireless communication includes a memory; and one or more processors coupled to the memory, the memory and the one or more processors configured to identify RAT state information associated with the UE, the RAT state information including an indication of whether the UE is operating in a steady state or is operating in a transition state; and adapt a codec rate associated with an application of the UE based at least in part on whether the UE is operating in the steady state or is operating in the transition state.

In some aspects, the indication indicates that the UE is operating in the transition state, and the one or more processors, when adapting the codec rate, are to: pause a determination of an adapted codec rate for a period of time based at least in part on the indication that the UE is operating in the transition state; and resume the determination of the adapted codec rate after the period of time.

In some aspects, the determination of the adapted codec rate is resumed based at least in part on another indication that the UE is operating in the steady state.

In some aspects, the indication indicates that the UE is operating in the transition state, and the one or more processors, when adapting the codec rate, are to: modify a time window associated with determining an adapted codec rate based at least in part on the indication that the UE is operating in the transition state, and determine the adapted codec rate based at least in part on the modified time window.

In some aspects, the indication indicates that the UE is operating in the transition state, and the codec rate is adapted based at least in part on a hysteresis-based trigger, a timer-based trigger, or an event-based trigger.

In some aspects, the transition state is associated with an ongoing configuration or radio network coordination procedure associated with the UE.

In some aspects, the transition state is associated with a radio reconfiguration of the UE, a handover of the UE, or a reselection associated with the UE.

In some aspects, the transition state is associated with a thermal state of the UE.

In some aspects, the transition state is associated with a power headroom state of the UE.

In some aspects, the transition state is associated movement of a cell in a non-terrestrial network.

In some aspects, the indication indicates that the UE is operating in the steady state, and the one or more processors, when adapting the codec rate, are to: determine an adapted codec rate based at least in part on the indication that the UE is operating in the steady state.

In some aspects, the adaptation of the codec rate is further based at least in part on an amount of data, associated with the application operating on the UE, that is queued for transmission by the UE.

In some aspects, a non-transitory computer-readable medium storing a set of instructions for wireless communication includes one or more instructions that, when executed by one or more processors of a UE, cause the UE to identify RAT state information associated with the UE, the RAT state information including an indication of whether the UE is operating in a steady state or is operating in a transition state; and adapt a codec rate associated with an application of the UE based at least in part on whether the UE is operating in the steady state or is operating in the transition state.

In some aspects, the indication indicates that the UE is operating in the transition state, and the one or more instructions, when causing the one or more processors to adapt the codec rate, cause the one or more processors to: pause a determination of an adapted codec rate for a period of time based at least in part on the indication that the UE is operating in the transition state; and resume the determination of the adapted codec rate after the period of time.

In some aspects, the determination of the adapted codec rate is resumed based at least in part on another indication that the UE is operating in the steady state.

In some aspects, the indication indicates that the UE is operating in the transition state, and the one or more instructions, when causing the one or more processors to adapt the codec rate, cause the one or more processors to: modify a time window associated with determining an adapted codec rate based at least in part on the indication that the UE is operating in the transition state, and determine the adapted codec rate based at least in part on the modified time window.

In some aspects, the indication indicates that the UE is operating in the transition state, and the codec rate is adapted based at least in part on a hysteresis-based trigger, a timer-based trigger, or an event-based trigger.

In some aspects, the transition state is associated with an ongoing configuration or radio network coordination procedure associated with the UE.

In some aspects, the transition state is associated with a radio reconfiguration of the UE, a handover of the UE, or a reselection associated with the UE.

In some aspects, the transition state is associated with a thermal state of the UE.

In some aspects, the transition state is associated with a power headroom state of the UE.

In some aspects, the transition state is associated movement of a cell in a non-terrestrial network.

In some aspects, the indication indicates that the UE is operating in the steady state, and the one or more instructions, when causing the one or more processors to adapt the codec rate, cause the one or more processors to: determine an adapted codec rate based at least in part on the indication that the UE is operating in the steady state.

In some aspects, the adaptation of the codec rate is further based at least in part on an amount of data, associated with the application operating on the UE, that is queued for transmission by the UE.

In some aspects, an apparatus for wireless communication includes means for identifying RAT state information associated with the apparatus, the RAT state information including an indication of whether the apparatus is operating in a steady state or is operating in a transition state; and means for adapting a codec rate associated with an application of the apparatus based at least in part on whether the apparatus is operating in the steady state or is operating in the transition state.

In some aspects, the indication indicates that the apparatus is operating in the transition state, and means for adapting the codec rate comprises: means for pausing a determination of an adapted codec rate for a period of time based at least in part on the indication that the apparatus is operating in the transition state; and means for resuming the determination of the adapted codec rate after the period of time.

In some aspects, the determination of the adapted codec rate is resumed based at least in part on another indication that the apparatus is operating in the steady.

In some aspects, the indication indicates that the apparatus is operating in the transition state, and the means for adapting the codec rate comprises: means for modifying a time window associated with determining an adapted codec rate based at least in part on the indication that the apparatus is operating in the transition state, and means for determining the adapted codec rate based at least in part on the modified time window.

In some aspects, the indication indicates that the apparatus is operating in the transition state, and the codec rate is adapted based at least in part on a hysteresis-based trigger, a timer-based trigger, or an event-based trigger.

In some aspects, the transition state is associated with an ongoing configuration or radio network coordination procedure associated with the apparatus.

In some aspects, the transition state is associated with a radio reconfiguration of the apparatus, a handover of the apparatus, or a reselection associated with the apparatus.

In some aspects, the transition state is associated with a thermal state of the apparatus.

In some aspects, the transition state is associated with a power headroom state of the apparatus.

In some aspects, the transition state is associated movement of a cell in a non-terrestrial network.

In some aspects, the indication indicates that the apparatus is operating in the steady state, and the means for adapting the codec rate comprises: means for determining an adapted codec rate based at least in part on the indication that the apparatus is operating in the steady state.

In some aspects, the adaptation of the codec rate is further based at least in part on an amount of data, associated with the application operating on the apparatus, that is queued for transmission by the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
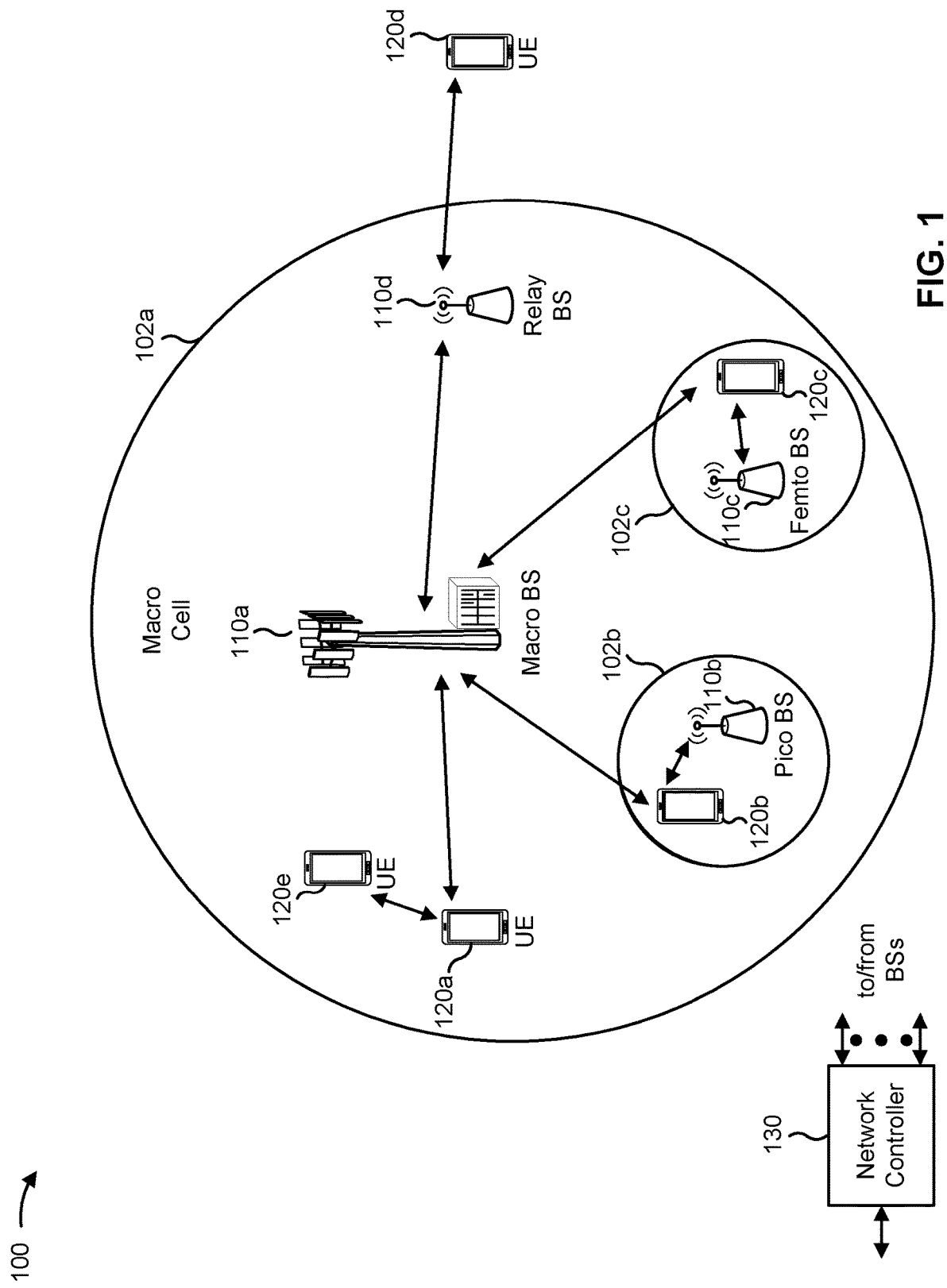
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
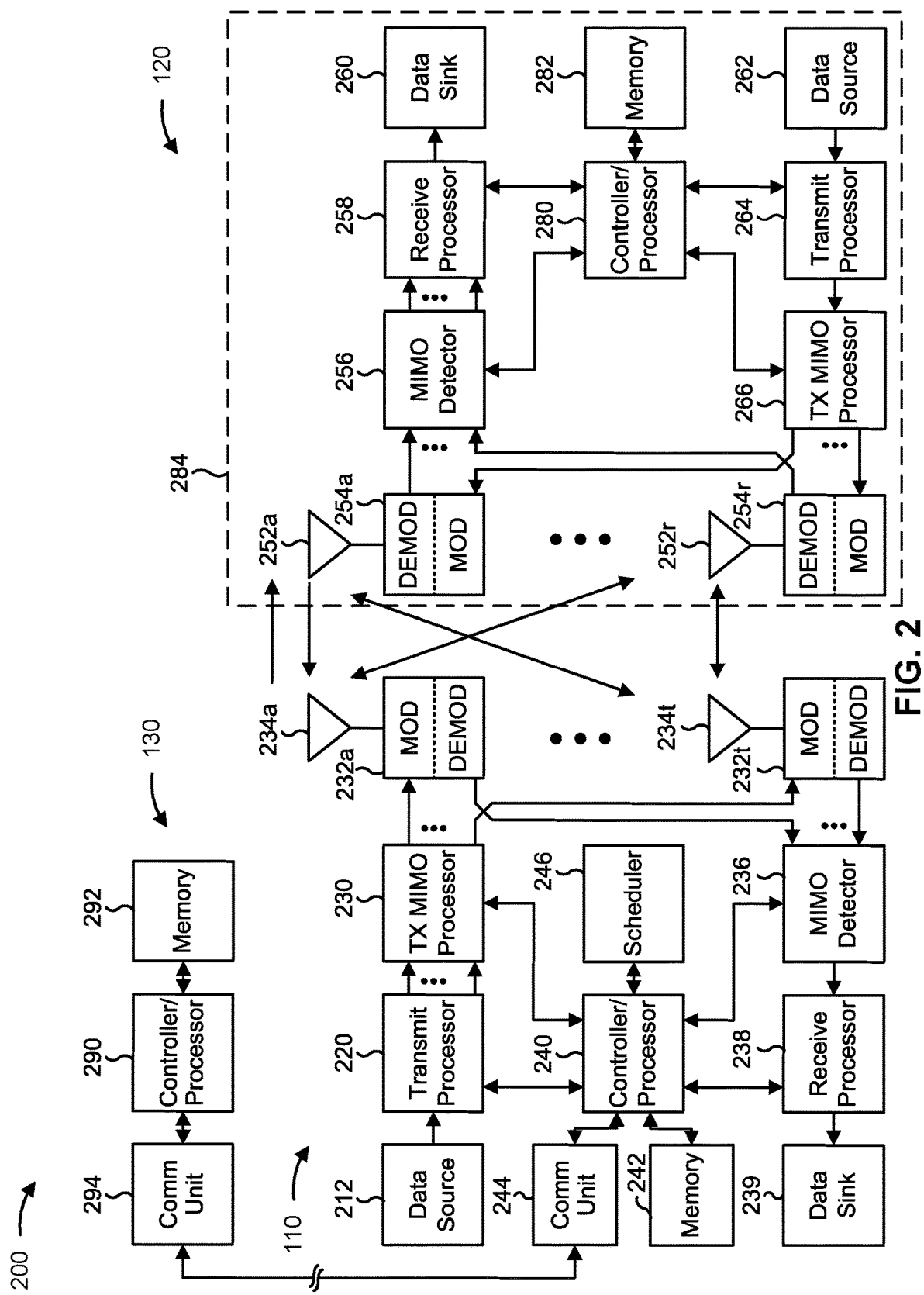
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-5).

The controller/processor 240 of the base station 110, the controller/processor 280 of the UE 120, and/or any other component(s) of FIG. 2 may perform one or more techniques associated with radio aware codec rate adaptation, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some examples, executing instructions may include running the instructions, converting the instructions, compiling the instructions, and/or interpreting the instructions, among other examples.

In some aspects, the UE 120 may include means for identifying RAT state information associated with the UE, the RAT state information including an indication of whether the UE is operating in a steady state or is operating in a transition state; means for adapting a codec rate associated with an application of the UE based at least in part on whether the UE is operating in the steady state or is operating in the transition state; and/or the like. In some aspects, such means may include one or more components of UE 120 described in connection with While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a dynamic radio environment, a configuration of a UE (e.g., a UE 120) may need to be adapted as a result of changing radio conditions. In some cases, a base station (e.g., base station 110) may reconfigure the UE through a radio bearer procedure based on, for example, results of physical (PHY) layer measurements and/or information associated with a channel quality, such as channel state feedback. Alternatively, the UE can trigger the reconfiguration in some scenarios. For example, the UE may be permitted to initiate a radio link failure (RLF) procedure for different radio conditions, a result of which is a reconfiguration procedure being performed toward the UE.

Notably, a reconfiguration of the UE (whether triggered by the network or the UE) can be disruptive to a service at the UE. For example, a service provided by a given application (e.g., a video call application) may suffer quality issues and packet drops at the modem level. In operation, the application periodically provides packets for transmission by the UE. This data is queued in a modem packet data convergence protocol (PDCP) uplink watermark while waiting for transmission opportunity. Generally, the UE provides a buffer status report (BSR) to the base station (as triggered by a configuration of the UE) and transmits uplink packets to the base station upon receipt of an uplink grant provided to the UE (e.g., an uplink grant provided in response to the BSR).

However, there may be a scenario in which an uplink grant is not available for a significant amount of time (e.g., due to loading, scheduling, configuration, or the like) and/or the UE is experiencing poor radio conditions (e.g., a power headroom limitation, a thermal issue, a PHY configuration issue, a synchronization issue, or the like). In such a scenario, the application continues providing data in accordance with an application protocol, which causes a quantity of packets in the modem at the PDCP (or other entity) to continue increasing. This results in an increased BSR value being reported to the base station. Upon receiving an uplink grant responsive to the BSR, the UE transmits the outstanding packets according to a first come first serve (FCFS) model on a given logical channel, while respecting a medium access control (MAC) level logical channel prioritization (LCP).

Some applications, such as a video call application, are delay sensitive, meaning that transmitting stale packets may be undesirable and, therefore, it may be preferable to drop stale packets (rather than transmit them). While the PDCP may be configured to implement such a technique using a discard timer (e.g., Timer_Discard), identifying an optimal value for the discard timer is challenging when different types of traffic are multiplexed (e.g., on a default bearer). For this reason, an application host on the UE may periodically determine information indicating a number of bytes of outstanding packets specific to the application that are present in the modem, as well as radio related information (e.g., information that identifies a type of radio access technology (RAT), information indicating a total number of bytes transmitted by the modem, or the like). Based on the number of bytes of outstanding application-specific packets and the radio related information, the application host may perform filtering to cause (1) a total number of packets to be reduced to satisfy a packet threshold (where older packets are dropped first), (2) packets older than a packet age threshold to be dropped (3) packets of one or more specific types (e.g., a packet associated with a differential frame) to be dropped, and/or (4) a codec rate to be dynamically adjusted (e.g., through an upgrade, a downgrade, or a change to the protocol).

Adapting the codec rate based on the number of bytes of outstanding application-specific packets and the radio related information (e.g., the total number of bytes transmitted by the modem) is problematic when the UE is experiencing a reconfiguration (e.g., to improve coverage, quality, or the like) because the UE may not transmit any data during the reconfiguration, meaning that the codec rate may be lowered further than necessary. Put another way, this "radio unaware" manner of adapting the codec rate based on the number of bytes of outstanding application-specific packets and the total number of transmitted bytes is problematic when the UE is in the process of being reconfigured or undergoing some other type of radio network coordination procedure. Thus, any time radio conditions change—such that the UE moves between cells, beams, is handed over, is reconfigured, or a fallback mechanism is used to preserve radio coverage—the codec rate may be adapted to be lower, which reduces a quality associated with the service provided by the application. This issue is predominant in UE mobility scenarios and with mixed cell configurations of 5G and 4G coverage with a non-standalone mode of operation. Further, this issue is particularly present in a millimeter wave (mmW) configuration or a moving cell configuration (e.g., a non-terrestrial network (NTN) configuration).

More specifically, a low pass filter type of technique is used to adapt the codec rate. According to this technique, a sample (e.g., including information indicating the number of bytes of outstanding application-specific packets and information that identifies a transmission data rate of the UE) is collected every 30 milliseconds (ms) during a 500 ms time window. Next, a moving average is calculated in order to determine a codec rate that matches the average transmission data rate. However, during a reconfiguration of the UE, there may be no transmission of data on the uplink for a significant amount of time (e.g., up to 300 ms). After the reconfiguration, the amount of outstanding data is reported through a BSR, and the base station may give a grant sufficient to transmit the outstanding data in a timely manner (e.g., within 50 ms) to ensure quality. Thus, the UE and the base station may be synchronized with respect to input data (e.g., as reported through the BSR) and output data (e.g., as transmitted over the air based on the uplink grant) after a period of time (e.g., approximately 350 ms). Here, however, without waiting for the base station to adjust the uplink grant after the reconfiguration, the codec rate can be reduced to low quality, and the low quality codec rate continues to be used after the reconfiguration (even though the UE and the base station are synchronized as described above). Further, since a later uplink grant will not allocate an amount of resources to the UE that is higher than the amount of resources indicated as being needed by a BSR provided by the UE, the codec rate may not readily be raised to a higher quality at a later time.

Some techniques and apparatuses described herein enable radio aware codec rate adaptation by a UE. In some aspects, the UE identifies radio access technology (RAT) state information associated with the UE. The RAT state information may include an indication of whether the UE is operating in a steady state or is operating in a transition state. The UE may then adapt a codec rate associated with an application of the UE based at least in part on whether the UE is operating in the steady state or is operating in the transition state. Additional details are provided below.

As a result, a codec rate of an application operating on the UE may be adapted in a radio aware manner, thereby increasing stability of codec rate adaptation and permitting the codec rate to be adjusted in response to radio throughput that is interrupted due to transitions of the UE, without negatively impacting performance. Notably, the techniques and apparatuses for radio aware codec rate adaptation described herein are comparatively faster than a network based solution for radio aware codec rate adaptation, meaning that application performance is improved using the UE-centric technique.

Figure 3:
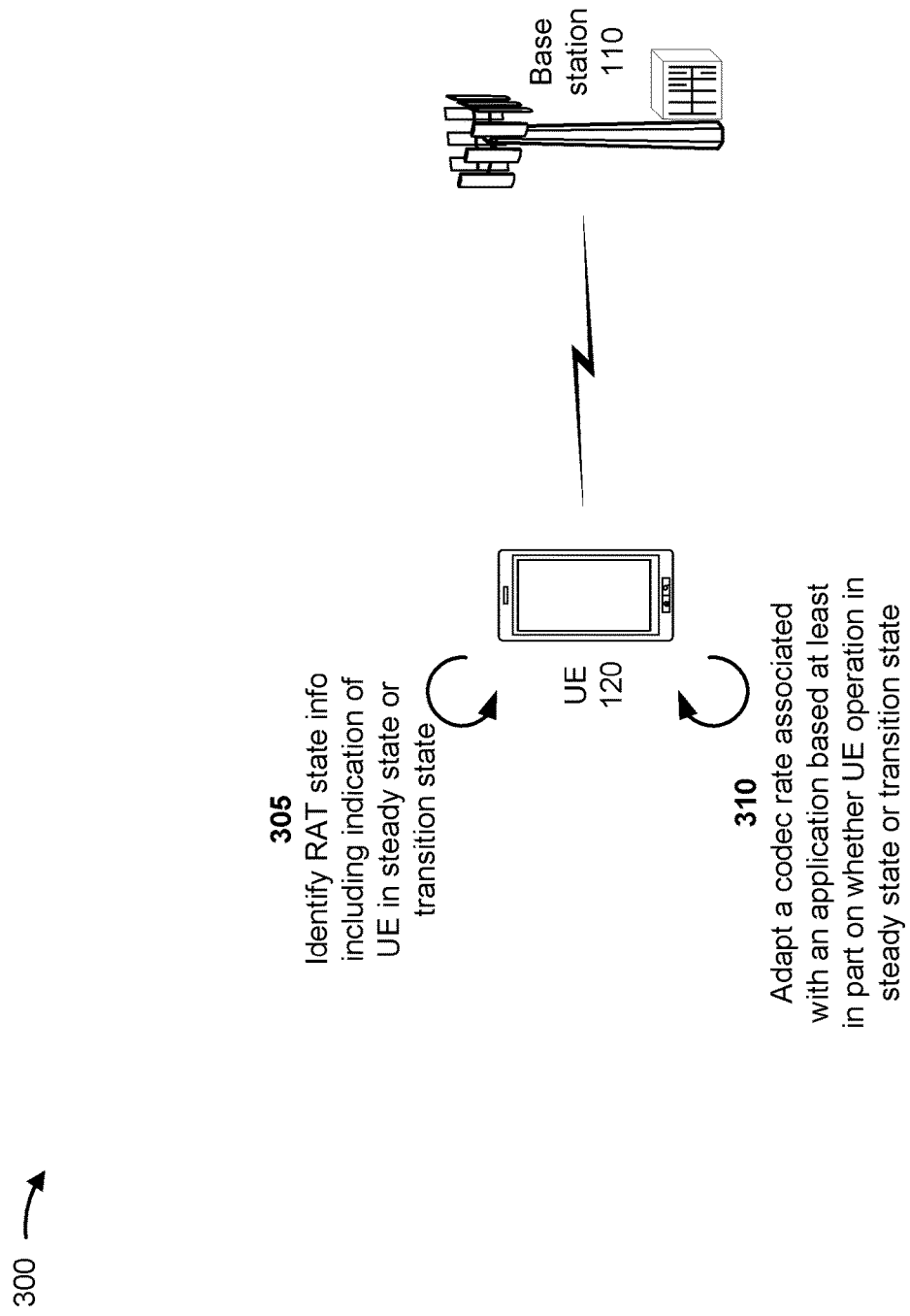
FIG. 3 is a diagram illustrating an example associated with radio aware codec rate adaptation, in accordance with the present disclosure.

FIG. 3 is a diagram illustrating an example 300 associated with radio aware codec rate adaptation, in accordance with the present disclosure. As shown in FIG. 3, example 300 includes a UE 120. In some aspects, the UE 120 may be in communication with a base station 110. The UE 120 and the base station 110 may be included in a wireless network, such as wireless network 100, and may communicate on a wireless access link, which may include an uplink and a downlink. In example 300, an application (e.g., a video call application) operating on the UE 120 provides packets to a modem of the UE 120 for transmission on the wireless access link.

As shown by reference 305, the UE 120 may identify RAT state information associated with the UE 120. For example, an application host associated with the application may identify RAT state information associated with the UE 120. In some aspects, the UE 120 may determine the RAT state information based at least in part on information provided by a modem of the UE 120.

The RAT state information includes information indicating whether the UE 120 is operating in a steady state or is operating in a transition state. A steady state is a state of operation in which radio conditions associated with the UE 120 are such that the UE 120 can reliably transmit and/or receive data on the wireless access link with the base station 110. In some aspects, while operating in the steady state, the UE 120 transmits BSRs (e.g., including information that identifies an amount of data associated with the application that is to be transmitted by the UE 120) and expects uplink grants (e.g., to be used for transmitting the data associated with the application).

A transition state is a state of operation in which radio conditions associated with the UE 120 are such that the UE may be unable to reliably transmit and/or receive data on the wireless access link with base station 110. The transition state may occur when, for example, the UE 120 is experiencing a radio configuration or radio network coordination procedure associated with the UE 120. For example, when the UE 120 is going through a radio reconfiguration, a handover, or a reselection, the UE 120 may be operating in the transition state.

In some aspects, the transition state is associated with a thermal state of the UE 120. For example, when a temperature of one or more components of the UE 120 is increasing or has increased (e.g., by a threshold amount) over a particular of time, the UE 120 may be operating in the transition state. In some aspects, the transition state is associated with a power headroom state of the UE. For example, when a power headroom of the UE 120 is decreasing or has decreased (e.g., by a threshold amount) over a particular period of time, the UE 120 may be operating in the transition state. In some aspects, the transition state is associated with movement of a cell in a non-terrestrial network (NTN). For example, when an NTN cell used by the UE 120 moves or is moving such that the UE 120 needs to be moved to another cell of the NTN, the UE 120 may be in the transition state.

As shown by reference 310, the UE 120 (e.g., the application host) may adapt a codec rate associated with the application based at least in part on whether the UE 120 is operating in the steady state or is operating in the transition state.

In some aspects, when the indication indicates that the UE 120 is operating in the transition state, the UE 120, when adapting the codec rate associated with the application, pauses a determination of an adapted codec rate for a period of time. That is, the UE 120 may pause a determination of the adapted codec rate based at least in part on the indication that the UE is operating in the transition state. In some aspects, the UE 120 resumes the determination of the adapted codec rate after the period of time. For example, in some aspects, the UE 120 resumes the determination of the adapted codec rate based at least in part on another indication that the UE is operating in the steady state (e.g., when the UE 120 determines that the UE 120 has returned to the steady state). In this way, the codec adaptation logic can be adjusted to account for the transition state, meaning that the adapted codec rate may not be lowered purely as a result of the changing radio conditions associated with the UE 120.

As an example, when determining the adapted codec rate, rather than using an average data rate in a last period of time (e.g., 500 ms) in fixed manner without regard to radio conditions associated with the UE 120, the UE 120 can pause determination of the adapted codec rate when the UE 120 is in the transition state (e.g., when a handover is occurring). Here, the determination of the adapted codec rate may remain paused until the radio procedure is completed, and the UE 120 returns to operation in the steady state. In this way, the codec adaptation is based on an uplink throughput during steady state operation and is not impacted by intermediate pauses caused by dynamic radio conditions or procedures. In such a case, when the UE 120 is in the steady state, if the UE 120 can transmit the application data relatively quickly, then codec rate adaptation to a lower quality can be avoided.

In some aspects, when the indication indicates that the UE is operating in the transition state, the UE 120, when adapting the codec rate associated with the application, modifies a time window associated with determining an adapted codec rate based at least in part on the indication that the UE is operating in the transition state. Here, the UE 120 determines the adapted codec rate based at least in part on the modified time window.

As an example, when determining the adapted codec rate, rather than using an average data rate in a fixed period of time without regard to radio conditions associated with the UE 120, the UE 120 can modify (e.g., shorten or lengthen) a sampling period associated with determining the adapted codec rate (e.g., from 500 ms to 200 ms). That is, in some aspects, the UE 120 may determine the manner in which the codec rate is adapted (e.g., modify the sampling period and/or bit depth).

In some aspects, when the indication indicates that the UE 120 is operating in the transition state, the UE 120 may adapt the codec rate based at least in part on a hysteresis-based trigger, a timer-based trigger, or an event-based trigger.

In some aspects, when the indication indicates that the UE 120 is operating in the steady state, the UE 120, when adapting the codec rate, may determine the adapted codec rate based at least in part on the indication that the UE 120 is operating in the steady state. That is, the UE 120 may determine the adapted codec rate without pausing the determination or modifying a time period associated with determining the adapted codec rate in a case in which the UE 120 is operating in the steady state.

In some aspects, the UE 120 may adapt the codec rate based at least in part on one or more other items of information (e.g., provided by the modem). For example, the UE 120 may adapt the codec rate based at least in part on an amount of data, associated with the application operating on the UE 120, that is queued for transmission by the UE 120. As another example, the UE 120 may adapt the codec rate based at least in part on a total amount of data transmitted by the UE 120 during a period of time. As another example, the UE 120 may adapt the codec rate based at least in part on a type of RAT being used by the UE 120 (e.g., NR, LIE, WCDMA, or the like). As another example, the UE 120 may adapt the codec rate based at least in part on information associated with a radio configured throughput (e.g., a radio resource control (RRC) configuration, a MAC configuration, a PHY layer configuration, or the like).

In some aspects, the UE 120 may adapt the codec rate based at least in part on one or more characteristics of a packet (or group of packets) associated with the application operating on the UE 120, that is queued for transmission by the UE. The one or more characteristics may include, for example, a type of the packet; a priority of the packet; whether the packet is a data packet or a configuration packet, whether the packet is associated with a full frame, a partial frame, or a differential frame; or another type of packet characteristic.

As indicated above, FIG. 3 is provided as an example. Other examples may differ from what is described with respect to FIG. 3.

Figure 4:
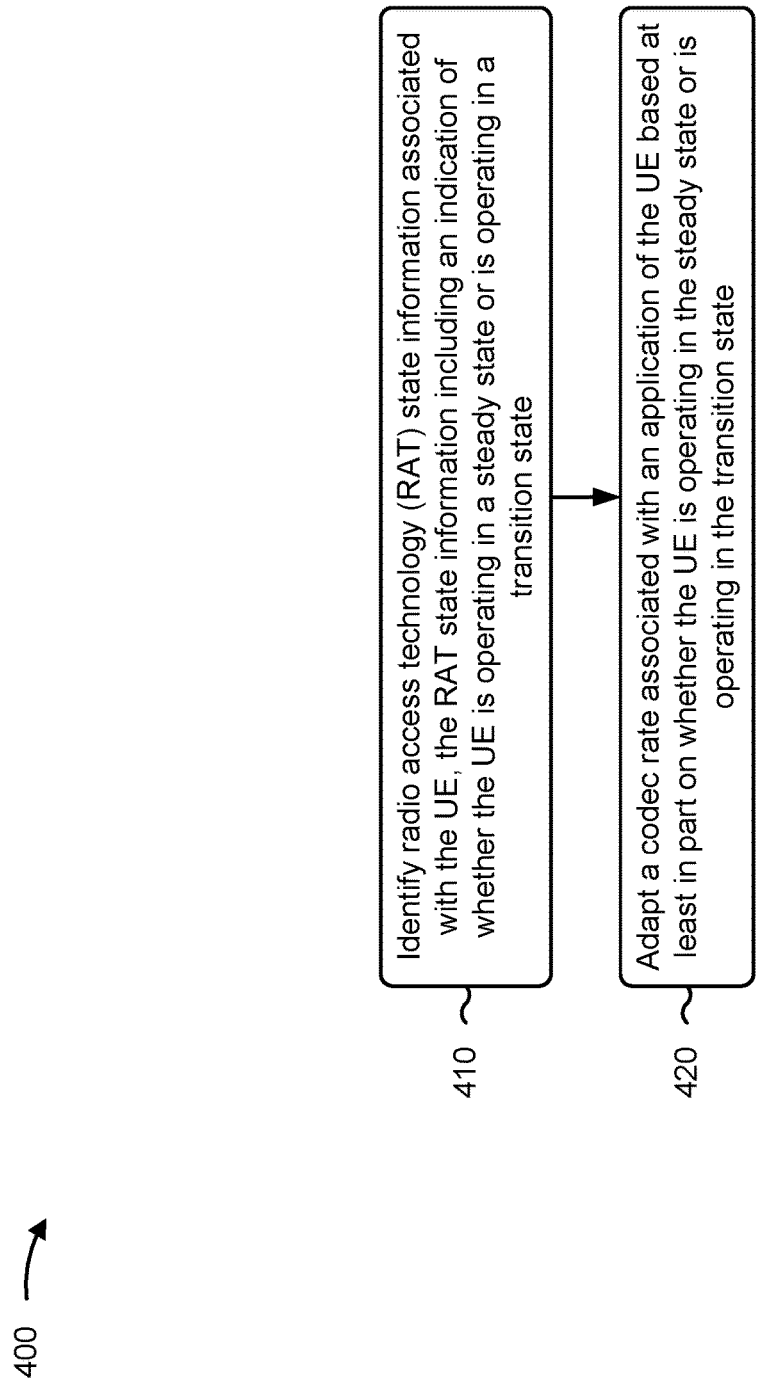
FIG. 4 is a diagram illustrating an example process associated with radio aware codec rate adaptation, in accordance with the present disclosure.

FIG. 4 is a diagram illustrating an example process 400 performed, for example, by a UE, in accordance with the present disclosure. Example process 400 is an example where the UE (e.g., UE 120) performs operations associated with radio aware codec rate adaptation.

As shown in FIG. 4, in some aspects, process 400 may include identifying RAT state information associated with the UE, the RAT state information including an indication of whether the UE is operating in a steady state or is operating in a transition state (block 410). For example, the UE (e.g., using RAT state identification component 508, depicted in FIG. 5) may identify RAT state information associated with the UE, the RAT state information including an indication of whether the UE is operating in a steady state or is operating in a transition state, as described above.

As further shown in FIG. 4, in some aspects, process 400 may include adapting a codec rate associated with an application of the UE based at least in part on whether the UE is operating in the steady state or is operating in the transition state (block 420). For example, the UE (e.g., using codec rate adaptation component 510, depicted in FIG. 5) may adapt a codec rate associated with an application of the UE based at least in part on whether the UE is operating in the steady state or is operating in the transition state, as described above.

Process 400 may include additional aspects, such as any single aspect or any combination of aspects described below and/or in connection with one or more other processes described elsewhere herein.

In a first aspect, the indication indicates that the UE is operating in the transition state, and adapting the codec rate comprises pausing a determination of an adapted codec rate for a period of time based at least in part on the indication that the UE is operating in the transition state, and resuming the determination of the adapted codec rate after the period of time.

In a second aspect, alone or in combination with the first aspect, the determination of the adapted codec rate is resumed based at least in part on another indication that the UE is operating in the steady state.

In a third aspect, alone or in combination with one or more of the first and second aspects, the indication indicates that the UE is operating in the transition state, and adapting the codec rate comprises modifying a time window associated with determining an adapted codec rate based at least in part on the indication that the UE is operating in the transition state, and determining the adapted codec rate based at least in part on the modified time window.

In a fourth aspect, alone or in combination with one or more of the first through third aspects, the indication indicates that the UE is operating in the transition state, and the codec rate is adapted based at least in part on a hysteresis-based trigger, a timer-based trigger, or an event-based trigger.

In a fifth aspect, alone or in combination with one or more of the first through fourth aspects, the transition state is associated with an ongoing configuration or radio network coordination procedure associated with the UE.

In a sixth aspect, alone or in combination with one or more of the first through fifth aspects, the transition state is associated with a radio reconfiguration of the UE, a handover of the UE, or a reselection associated with the UE.

In a seventh aspect, alone or in combination with one or more of the first through sixth aspects, the transition state is associated with a thermal state of the UE.

In an eighth aspect, alone or in combination with one or more of the first through seventh aspects, the transition state is associated with a power headroom state of the UE.

In a ninth aspect, alone or in combination with one or more of the first through eighth aspects, the transition state is associated movement of a cell in a non-terrestrial network.

In a tenth aspect, alone or in combination with one or more of the first through ninth aspects, the indication indicates that the UE is operating in the steady state, and adapting the codec rate comprises determining an adapted codec rate based at least in part on the indication that the UE is operating in the steady state.

In an eleventh aspect, alone or in combination with one or more of the first through tenth aspects, the adaptation of the codec rate is further based at least in part on an amount of data, associated with the application operating on the UE, that is queued for transmission by the UE.

In a twelfth aspect, alone or in combination with one or more of the first through eleventh aspects, the adaptation of the codec rate is further based at least in part on a total amount of data transmitted by the UE during a period of time.

In a thirteenth aspect, alone or in combination with one or more of the first through twelfth aspects, the adaption of the codec rate is further based at least in part on a type of RAT being used by the UE.

In a fourteenth aspect, alone or in combination with one or more of the first through thirteenth aspects, the adaption of the codec rate is further based at least in part on information associated with a radio configured throughput.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
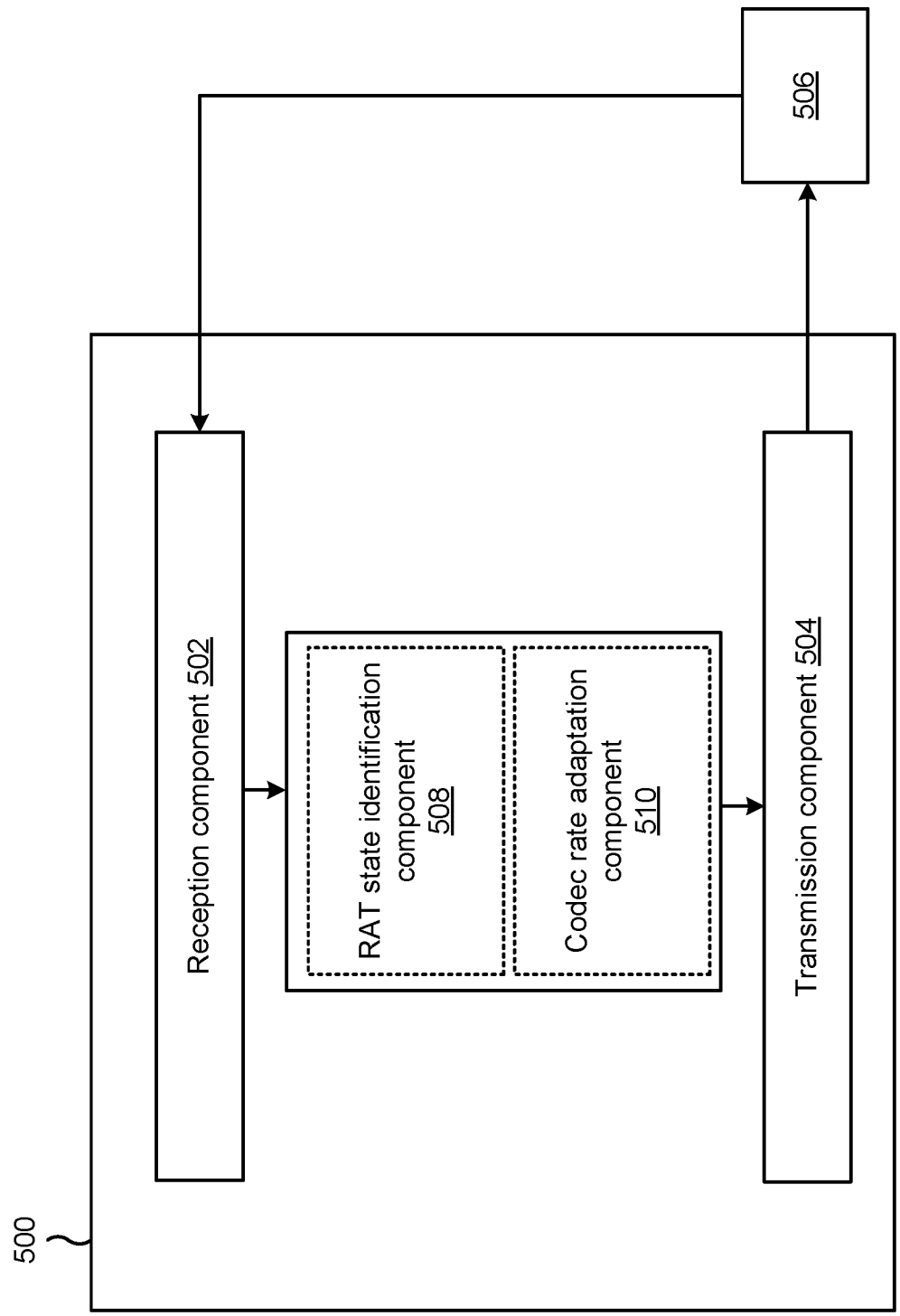
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include one or more of a RAT state identification component 508 or a codec rate adaptation component 510, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The RAT state identification component 508 may identify RAT state information associated with the UE, the RAT state information including an indication of whether the UE is operating in a steady state or is operating in a transition state. In some aspects, the RAT state identification component 508 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The codec rate adaptation component 510 may adapt a codec rate associated with an application of the UE based at least in part on whether the UE is operating in the steady state or is operating in the transition state. In some aspects, the codec rate adaptation component 510 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a UE, comprising: identifying RAT state information associated with the UE, the RAT state information including an indication of whether the UE is operating in a steady state or is operating in a transition state; and adapting a codec rate associated with an application of the UE based at least in part on whether the UE is operating in the steady state or is operating in the transition state.

Aspect 2: The method of Aspect 1, wherein the indication indicates that the UE is operating in the transition state, and wherein adapting the codec rate comprises: pausing a determination of an adapted codec rate for a period of time based at least in part on the indication that the UE is operating in the transition state; and resuming the determination of the adapted codec rate after the period of time.

Aspect 3: The method of Aspect 2, wherein the determination of the adapted codec rate is resumed based at least in part on another indication that the UE is operating in the steady state.

Aspect 4: The method of any of Aspects 1-3, wherein the indication indicates that the UE is operating in the transition state, and wherein adapting the codec rate comprises: modifying a time window associated with determining an adapted codec rate based at least in part on the indication that the UE is operating in the transition state, and determining the adapted codec rate based at least in part on the modified time window.

Aspect 5: The method of any of Aspects 1-4, wherein the indication indicates that the UE is operating in the transition state, and wherein the codec rate is adapted based at least in part on a hysteresis-based trigger, a timer-based trigger, or an event-based trigger.

Aspect 6: The method of any of Aspects 1-5, wherein the transition state is associated with an ongoing configuration or radio network coordination procedure associated with the UE.

Aspect 7: The method of any of Aspects 1-6, wherein the transition state is associated with a radio reconfiguration of the UE, a handover of the UE, or a reselection associated with the UE.

Aspect 8: The method of any of Aspects 1-7, wherein the transition state is associated with a thermal state of the UE.

Aspect 9: The method of any of Aspects 1-8, wherein the transition state is associated with a power headroom state of the UE.

Aspect 10: The method of any of Aspects 1-9, wherein the transition state is associated movement of a cell in a non-terrestrial network.

Aspect 11: The method of Aspect 1, wherein the indication indicates that the UE is operating in the steady state, and wherein adapting the codec rate comprises: determining an adapted codec rate based at least in part on the indication that the UE is operating in the steady state.

Aspect 12: The method of any of Aspects 1-11, wherein the adaptation of the codec rate is further based at least in part on an amount of data, associated with the application operating on the UE, that is queued for transmission by the UE.

Aspect 13: The method of any of Aspects 1-12, wherein the adaptation of the codec rate is further based at least in part on a total amount of data transmitted by the UE during a period of time.

Aspect 14: The method of any of Aspects 1-13, wherein the adaption of the codec rate is further based at least in part on a type of RAT being used by the UE.

Aspect 15: The method of any of Aspects 1-14, wherein the adaption of the codec rate is further based at least in part on information associated with a radio configured throughput.

Aspect 16: The method of any of Aspects 1-15, wherein the adaption of the codec rate is further based at least in part one or more characteristics of a packet, associated with the application operating on the UE, that is queued for transmission by the UE.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying radio access technology (RAT) state information associated with the UE, the RAT state information including an indication of whether the UE is operating in a steady state or is operating in a transition state; and
   adapting a codec rate associated with an application of the UE based at least in part on whether the UE is operating in the steady state or is operating in the transition state.

2. The method of claim 1, wherein the indication indicates that the UE is operating in the transition state, and wherein adapting the codec rate comprises:
   pausing a determination of an adapted codec rate for a period of time based at least in part on the indication that the UE is operating in the transition state; and
   resuming the determination of the adapted codec rate after the period of time, wherein adapting the codec rate is based at least in part on the determination of the adapted codec rate.

3. The method of claim 2, wherein the determination of the adapted codec rate is resumed based at least in part on another indication that the UE is operating in the steady state.

4. The method of claim 1, wherein the indication indicates that the UE is operating in the transition state, and wherein adapting the codec rate comprises:
   modifying a time window associated with determining an adapted codec rate based at least in part on the indication that the UE is operating in the transition state, and determining the adapted codec rate based at least in part on the modified time window wherein adapting the codec rate is based at least in part on determining the adapted codec rate.

5. The method of claim 1, wherein the indication indicates that the UE is operating in the transition state, and wherein the codec rate is adapted based at least in part on a hysteresis-based trigger, a timer-based trigger, or an event-based trigger.

6. The method of claim 1, wherein the transition state is associated with an ongoing configuration or radio network coordination procedure associated with the UE.

7. The method of claim 1, wherein the transition state is associated with a radio reconfiguration of the UE, a handover of the UE, or a reselection associated with the UE.

8. The method of claim 1, wherein the transition state is associated with a thermal state of the UE.

9. The method of claim 1, wherein the transition state is associated with a power headroom state of the UE.

10. The method of claim 1, wherein the transition state is associated movement of a cell in a non-terrestrial network.

11. The method of claim 1, wherein the indication indicates that the UE is operating in the steady state, and wherein adapting the codec rate comprises:
determining an adapted codec rate based at least in part on the indication that the UE is operating in the steady state.

12. The method of claim 1, wherein the adaptation of the codec rate is further based at least in part on an amount of data, associated with the application operating on the UE, that is queued for transmission by the UE.

13. The method of claim 1, wherein the adaptation of the codec rate is further based at least in part on a total amount of data transmitted by the UE during a period of time.

14. The method of claim 1, wherein the adaption of the codec rate is further based at least in part on a type of RAT being used by the UE.

15. The method of claim 1, wherein the adaption of the codec rate is further based at least in part on information associated with a radio configured throughput.

16. The method of claim 1, wherein the adaption of the codec rate is further based at least in part one or more characteristics of a packet, associated with the application operating on the UE, that is queued for transmission by the UE.

17. A user equipment (UE) for wireless communication, comprising:
a memory; and
one or more processors coupled to the memory, the one or more processors configured to:
identify radio access technology (RAT) state information associated with the UE, the RAT state information including an indication of whether the UE is operating in a steady state or is operating in a transition state; and
adapt a codec rate associated with an application of the UE based at least in part on whether the UE is operating in the steady state or is operating in the transition state.

18. The UE of claim 17, wherein the indication indicates that the UE is operating in the transition state, and wherein the one or more processors, when adapting the codec rate, are configured to:
pause a determination of an adapted codec rate for a period of time based at least in part on the indication that the UE is operating in the transition state; and
resume the determination of the adapted codec rate after the period of time, wherein adapting the codec rate is based at least in part on the determination of the adapted codec rate.

19. The UE of claim 18, wherein the determination of the adapted codec rate is resumed based at least in part on another indication that the UE is operating in the steady state.

20. The UE of claim 17, wherein the indication indicates that the UE is operating in the transition state, and wherein the one or more processors, when adapting the codec rate, are configured to:
modify a time window associated with determining an adapted codec rate based at least in part on the indication that the UE is operating in the transition state, and
determine the adapted codec rate based at least in part on the modified time window, wherein adapting the codec rate is based at least in part on determining the adapted codec rate.

21. The UE of claim 17, wherein the indication indicates that the UE is operating in the transition state, and wherein the codec rate is adapted based at least in part on a hysteresis-based trigger, a timer-based trigger, or an event-based trigger.

22. The UE of claim 17, wherein the transition state is associated with an ongoing configuration or radio network coordination procedure associated with the UE.

23. The UE of claim 17, wherein the transition state is associated with a radio reconfiguration of the UE, a handover of the UE, or a reselection associated with the UE.

24. The UE of claim 17, wherein the transition state is associated with a thermal state of the UE.

25. The UE of claim 17, wherein the transition state is associated with a power headroom state of the UE.

26. The UE of claim 17, wherein the transition state is associated with movement of a cell in a non-terrestrial network.

27. The UE of claim 17, wherein the indication indicates that the UE is operating in the steady state, and wherein the one or more processors, when adapting the codec rate, are configured to:
determine an adapted codec rate based at least in part on the indication that the UE is operating in the steady state.

28. The UE of claim 17, wherein the adaptation of the codec rate is further based at least in part on an amount of data, associated with the application operating on the UE, that is queued for transmission by the UE.

29. A non-transitory computer-readable medium storing a set of instructions for wireless communication, the set of instructions comprising:
one or more instructions that, when executed by one or more processors of a user equipment (UE), cause the UE to:
identify radio access technology (RAT) state information associated with the UE, the RAT state information including an indication of whether the UE is operating in a steady state or is operating in a transition state; and
adapt a codec rate associated with an application of the UE based at least in part on whether the UE is operating in the steady state or is operating in the transition state.

30. An apparatus for wireless communication, comprising:
means for identifying radio access technology (RAT) state information associated with the apparatus, the RAT state information including an indication of whether the apparatus is operating in a steady state or is operating in a transition state; and means for adapting a codec rate associated with an application of the apparatus based at least in part on whether the apparatus is operating in the steady state or is operating in the transition state.

\* \* \* \* \*